US007569140B2

(12) United States Patent
Kerfoot

(10) Patent No.: US 7,569,140 B2
(45) Date of Patent: Aug. 4, 2009

(54) DIRECTIONAL SPARGEWELL SYSTEM

(75) Inventor: William B. Kerfoot, Falmouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 313 days.

(21) Appl. No.: 11/272,446

(22) Filed: Nov. 10, 2005

(65) Prior Publication Data

US 2007/0105492 A1 May 10, 2007

(51) Int. Cl.
*C02F 1/78* (2006.01)

(52) U.S. Cl. ............... 210/192; 210/198.1; 210/170.07; 261/122.1; 261/123; 261/124; 261/DIG. 42

(58) Field of Classification Search ................. 210/192, 210/170.07, 142, 198.1, 200, 220, 258, 760, 210/747; 261/96, 108, 114.2, 121.1, 122.1, 261/123, 124, DIG. 42; 435/295.3, 297.1; 166/90.1, 265, 105.5, 306, 308.3, 310; 239/549, 239/552, 553.5
See application file for complete search history.

(56) References Cited

U.S. PATENT DOCUMENTS

| | | | |
|---|---|---|---|
| 1,920,719 A | | 8/1933 | Stich |
| 2,517,525 A | | 8/1950 | Cummings |
| 2,845,185 A | | 7/1958 | Winderweedle, Jr. |
| 2,946,446 A | | 7/1960 | Herbert |
| 3,027,009 A | | 3/1962 | Price |
| 3,206,178 A | | 9/1965 | Lamb |
| 3,219,520 A | | 11/1965 | Box |
| 3,276,994 A | | 10/1966 | Andrews |
| 3,441,216 A | | 4/1969 | Good |
| 3,570,218 A | | 3/1971 | Finney |
| 3,669,276 A | | 6/1972 | Woods |
| 3,708,206 A | | 1/1973 | Hard et al. |
| 3,814,394 A | | 6/1974 | Murray |
| 3,823,776 A | | 7/1974 | Holmes |
| 3,997,447 A | | 12/1976 | Breton et al. |
| 4,007,118 A | | 2/1977 | Ciambrone |
| 4,021,347 A | * | 5/1977 | Teller et al. .............. 210/195.1 |

(Continued)

FOREIGN PATENT DOCUMENTS

EP 0402158 12/1990

(Continued)

OTHER PUBLICATIONS

U.S. Appl. No. 10/745,939, filed Dec. 24, 2003, entitled "Directional Microporous Diffuser and Directional Sparging."

(Continued)

*Primary Examiner*—Matthew O Savage
*Assistant Examiner*—Lucas Stelling
(74) *Attorney, Agent, or Firm*—Lathrop & Gage LLP

(57) ABSTRACT

Treatment of contaminates by an apparatus that includes a directional microporous diffuser, a distribution arrangement to receive a fluid, an air compressor having a first outlet to feed air to the distribution arrangement, an ozone generator coupled between a second outlet of the air compressor and the distribution arrangement, to convert a portion of the oxygen in the air feed into ozone and a control arrangement to control the distribution arrangement to effect discharge of fluid into selected ones of mutually isolated regions in the directional microporous diffuser.

21 Claims, 6 Drawing Sheets

60
60d
56
60a
60c
60b

U.S. PATENT DOCUMENTS 4,048,072 A 9/1977 McCullough
4,049,552 A * 9/1977 Arff ............................ 210/192
4,064,163 A 12/1977 Drach et al.
4,178,239 A 12/1979 Lowther
4,203,837 A 5/1980 Hoge et al.
4,268,283 A 5/1981 Roberts
4,298,467 A 11/1981 Gartner et al.
4,310,057 A 1/1982 Brame
4,351,810 A 9/1982 Martinez et al.
4,360,234 A 11/1982 Hsueh et al.
4,614,596 A 9/1986 Wyness
4,622,139 A 11/1986 Brown
4,639,314 A 1/1987 Tyer
4,684,479 A 8/1987 D'Arrigo
4,695,447 A 9/1987 Shultz
4,696,739 A 9/1987 Pedneault
4,730,672 A 3/1988 Payne
4,804,050 A 2/1989 Kerfoot
4,832,122 A 5/1989 Corey et al.
4,837,153 A * 6/1989 Laurenson, Jr. .......... 261/122.1
4,838,434 A 6/1989 Miller et al.
4,844,795 A 7/1989 Halwani
4,851,163 A * 7/1989 Stanton et al. ........... 261/122.1
4,883,589 A 11/1989 Konon
4,941,957 A 7/1990 Zeff et al.
4,943,305 A 7/1990 Bernhardt
4,960,706 A 10/1990 Bliem et al.
4,966,717 A 10/1990 Kern
4,971,731 A 11/1990 Zipperian
5,078,921 A 1/1992 Zipperian
5,080,805 A 1/1992 Houser
5,116,163 A 5/1992 Bernhardt
5,120,442 A 6/1992 Kull et al.
5,122,165 A 6/1992 Wang
5,126,111 A 6/1992 Al-Ekabi et al.
5,133,906 A 7/1992 Louis
5,160,655 A 11/1992 Donker et al.
5,167,806 A 12/1992 Wang et al.
5,178,755 A 1/1993 Lacrosse
5,180,503 A 1/1993 Gorelick et al.
5,205,927 A 4/1993 Wickramanayake
5,215,680 A 6/1993 D'Arrigo
5,221,159 A 6/1993 Billings et al.
5,227,184 A 7/1993 Hurst
5,238,437 A 8/1993 Vowles et al.
5,246,309 A 9/1993 Hobby
5,248,395 A 9/1993 Rastelli et al.
5,254,253 A 10/1993 Behmann
5,269,943 A 12/1993 Wickramanayake
5,277,518 A 1/1994 Billings et al.
5,302,286 A 4/1994 Semprini et al.
5,332,333 A 7/1994 Bentley
5,362,400 A 11/1994 Martinell
5,364,537 A 11/1994 Paillard
5,375,539 A 12/1994 Rippberger
5,389,267 A 2/1995 Gorelick et al.
5,398,757 A 3/1995 Corte et al.
RE34,890 E 4/1995 Sacre
5,402,848 A 4/1995 Kelly
5,403,476 A 4/1995 Bernhardt
5,406,950 A 4/1995 Brandenburger et al.
5,425,598 A 6/1995 Pennington
5,427,693 A 6/1995 Mausgrover et al.
5,430,228 A 7/1995 Ciambrone et al.
5,431,286 A 7/1995 Xu et al.
5,451,320 A 9/1995 Wang et al.
5,464,309 A 11/1995 Mancini et al.
5,472,294 A 12/1995 Billings et al.
5,480,549 A 1/1996 Looney et al.
5,520,483 A 5/1996 Vigneri
5,525,008 A 6/1996 Wilson
5,545,530 A 8/1996 Satomura et al.
5,560,737 A 10/1996 Schuring et al.
5,588,490 A 12/1996 Suthersan et al.
5,609,798 A 3/1997 Liu et al.
5,615,974 A 4/1997 Land et al.
5,620,593 A 4/1997 Stagner
5,622,450 A 4/1997 Grant et al.
5,624,635 A 4/1997 Pryor
5,663,475 A 9/1997 Elgal
5,664,628 A 9/1997 Koehler et al.
5,667,733 A 9/1997 Waldron, Sr.
5,676,823 A 10/1997 McKay et al.
5,698,092 A 12/1997 Chen
5,827,485 A 10/1998 Libal et al.
5,833,388 A 11/1998 Edwards et al.
5,851,407 A 12/1998 Bowman et al.
5,855,775 A 1/1999 Kerfoot
5,860,598 A 1/1999 Cruz
5,879,108 A 3/1999 Haddad
5,925,257 A 7/1999 Albelda et al.
5,954,452 A 9/1999 Goldstein
5,967,230 A 10/1999 Cooper et al.
6,007,274 A 12/1999 Suthersan
6,017,449 A 1/2000 Eriksson et al.
6,083,403 A 7/2000 Tang et al.
6,083,407 A 7/2000 Kerfoot
6,086,769 A 7/2000 Kilambi et al.
6,136,186 A 10/2000 Gonzalez-Martin et al.
6,139,755 A 10/2000 Marte et al.
6,210,955 B1 4/2001 Hayes
6,214,240 B1 4/2001 Yasunaga et al.
6,217,767 B1 4/2001 Clark
6,254,310 B1 7/2001 Suthersan
6,283,674 B1 9/2001 Suthersan
6,284,143 B1 9/2001 Kerfoot
6,306,296 B1 10/2001 Kerfoot
6,312,605 B1 11/2001 Kerfoot
6,352,387 B1 3/2002 Briggs et al.
6,357,670 B2 3/2002 Ganan-Calvo
6,364,162 B1 4/2002 Johnson
6,391,259 B1 5/2002 Malkin et al.
6,403,034 B1 6/2002 Nelson et al.
6,428,694 B1 8/2002 Brown
6,436,285 B1 8/2002 Kerfoot
6,447,676 B1 9/2002 Kerfoot
6,488,850 B2 12/2002 Perriello
6,582,611 B1 6/2003 Kerfoot
6,596,161 B2 7/2003 Kerfoot
6,623,211 B2 9/2003 Kukor et al.
6,645,450 B2 11/2003 Stoltz et al.
6,733,207 B2 5/2004 Liebert, Jr. et al.
6,736,379 B1 5/2004 Wegner et al.
6,773,609 B1 8/2004 Hashizume
6,780,329 B2 8/2004 Kerfoot
6,787,038 B2 9/2004 Brusseau et al.
6,805,798 B2 10/2004 Kerfoot
6,818,136 B1 11/2004 Marek
6,827,861 B2 12/2004 Kerfoot
6,866,781 B2 3/2005 Schindler
6,872,318 B2 3/2005 Kerfoot
6,913,251 B2 7/2005 Kerfoot
6,984,329 B2 1/2006 Kerfoot
7,022,241 B2 4/2006 Kerfoot
7,033,492 B2 4/2006 Kerfoot
7,131,638 B2 11/2006 Kerfoot
7,156,984 B2 1/2007 Kerfoot
7,208,090 B2 4/2007 Applegate et al.
7,264,747 B2 9/2007 Kerfoot
7,300,039 B2 11/2007 Kerfoot
7,401,767 B2 7/2008 Kerfoot
2002/0029493 A1 3/2002 Baek
2002/0109247 A1 8/2002 Jager et al.
2003/0029792 A1 2/2003 Kerfoot

| | | | |
|---|---|---|---|
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | |
|---|---|---|
| EP | 0546335 | 6/1993 |
| GB | 2005655 A | 4/1979 |
| GB | 2185901 A | 8/1987 |
| JP | 4-171036 | 6/1992 |
| JP | 6-023378 | 1/1994 |
| JP | 409313814 | 12/1997 |
| WO | WO 98/21152 | 5/1998 |
| WO | WO 99/54258 | 10/1999 |
| WO | WO2005063367 | 7/2005 |

OTHER PUBLICATIONS

*ThinkVillage-Kerfoot LLC* v. *Groundwater & Environmental Services, Inc.*, Complaint for Patent Infringement, US District Court for the District of Massachusettes, Oct. 7, 2008, 5 pages.

*ThinkVillage-Kerfoot LLC* v. *Groundwater & Environmental Services, Inc.*, Answer and Counterclaims, Civil Action No. 1:08-cv-11711-GAO, Dec. 5, 2008, 7 pages.

*ThinkVillage-Kerfoot LLC* v. *Groundwater & Environmental Services, Inc.*, Amended Answer and Counterclaims, Civil Action No. 1:08-cv-1711-GAO, Dec. 15, 2008, 7 pages.

*ThinkVillage-Kerfoot LLC* v. *Groundwater & Environmental Services, Inc.*, Plaintiff's Response to Defendant Groundwater & Environmental Services, Inc.'s Amended Counterclaims, Civil Action No. 1:08-cv-11711-GAO, Dec. 30, 2008, 5 pages.

U.S. Appl. No. 10/745,939, selected pages from Image File Wrapper dated Jun. 22, 2006 through Jul. 2, 2008, 113 pages.

U.S. Appl. No. 09/470,167 (US. Pat. No. 6,436,285) Selected pages from File History dated Mar. 29, 2001 through Aug. 23, 2002, 38 pages.

U.S. Appl. No. 10/223,166 (US Pat No. 6,596,161) Selected pages from File History dated Nov. 06, 2002 through Jul. 22, 2003, 22 pages.

U.S. Appl. No. 10/354,584 Selected pages from Image File Wrapper dated Jul. 30, 2003 through Jul. 06, 2004, 32 pages.

U.S. Appl. No. 10/895,015, selected pages from Image File Wrapper dated Jul. 14, 2006 through Oct. 27, 2008, 102 pages.

U.S. Appl. No. 10/910,441 Selected pages from Image File Wrapper dated Dec. 01, 2004 through Sep. 12, 2005, 36 pages.

U.S. Appl. No. 10/997,452 Selected pages from Image File Wrapper dated Jun. 27, 2007 through Dec. 23, 2008, 129 pages.

U.S. Appl. No. 11/145,871 Selected pages from Image File Wrapper dated Jun. 12, 2007 through Dec. 16, 2008, 93 pages.

U.S. Appl. No. 11/328,475 Selected pages from Image File Wrapper dated Jun. 30, 2006 through Aug. 15, 2007, 45 pages.

U.S. Appl. No. 11/409,892 Selected pages from Image File Wrapper dated Jul. 31, 2006 through Nov. 26, 2008, 86 pages.

U.S. Appl. No. 11/485,080 Selected pages from Image File Wrapper dated May 11, 2007 through Jan. 9, 2009, 83 pages.

U.S. Appl. No. 11/485,223 Selected pages from Image File Wrapper dated Feb. 26, 2008 through Nov. 12, 2008, 23 pages.

U.S. Appl. No. 11/849,413, selected pages from Image File Wrapper dated Apr. 01, 2008 through Jan. 21, 2009, 45 pages.

U.S. Appl. No. 12/177,467, Restriction Requirement mailed Dec. 29, 2008, 8 pages.

* cited by examiner

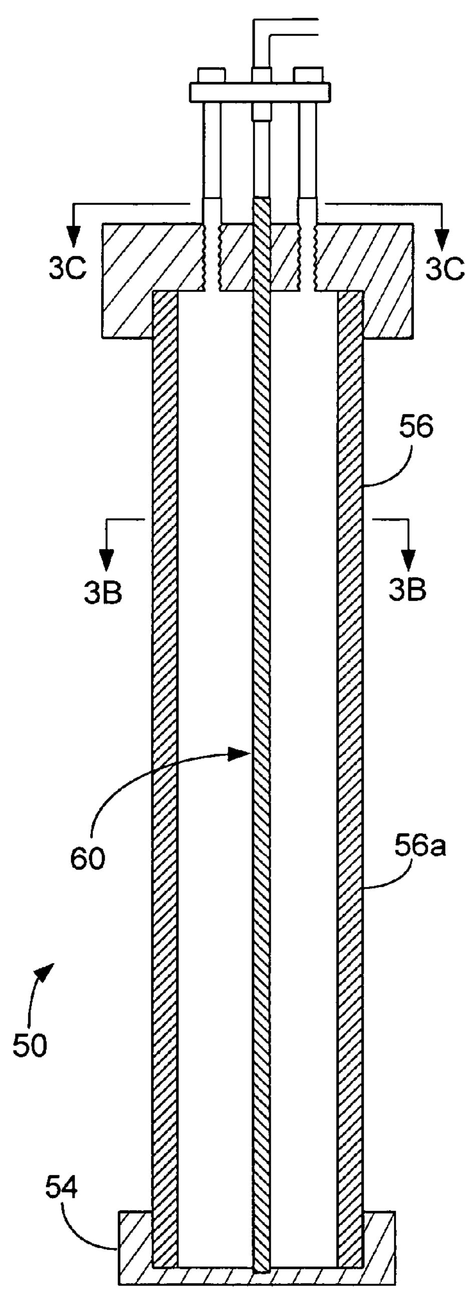
FIG. 3A
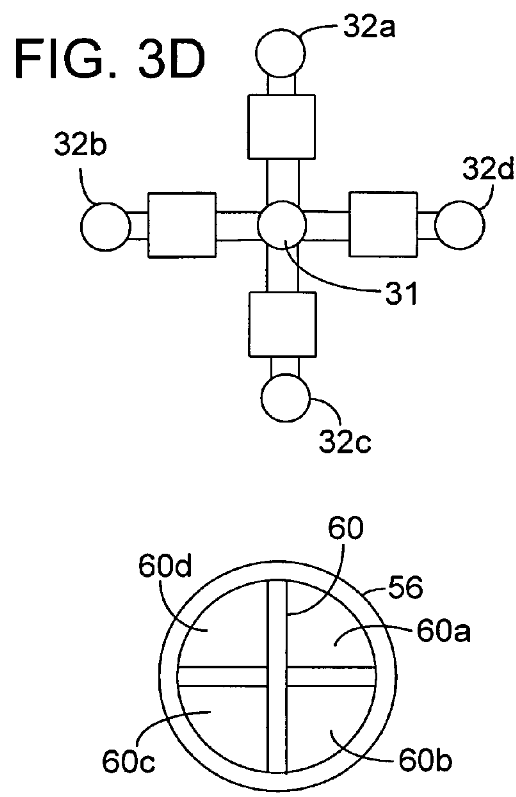
FIG. 3D
FIG. 3B
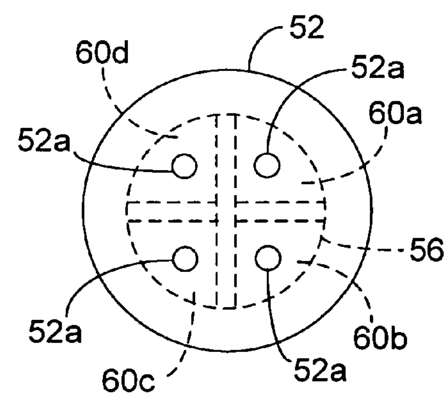
FIG. 3C

DIRECTIONAL SPARGEWELL SYSTEM

BACKGROUND

There is a well-recognized need to clean-up contaminants found in ground water, i.e., aquifers and surrounding soil formations. Such aquifers and surrounding soil formations may be contaminated with various constituents including organic compounds such as, volatile hydrocarbons, including chlorinated hydrocarbons such as dichloroethene (DCE), trichloroethene (TCE), and tetrachloroethene (PCE). Other contaminates that can be present include vinyl chloride, 1,1,1 trichloroethane (TCA), and very soluble gasoline additives such as methyl tertiary butyl ether (MTBE). Other contaminants may also be encountered.

SUMMARY

According to an aspect of the invention, a method includes delivering a stream of a fluid to a directional microporous diffuser that has a sidewall with microscopic openings and has a partitioned interior region to effect discharge of microbubbles from less than the entire sidewall portion of the directional microporous diffuser.

Other aspects of the invention include the directional microporous diffuser including an elongated member providing the sidewall, the sidewall defining an interior portion of said member and coupled to the first inlet port, a partition member that divides the interior of the elongated member into plural, mutually isolated regions and caps to seal ends of the directional microporous diffuser. The elongated member is a cylinder. The caps support the first inlet port and additional plural inlet ports. The first inlet port and additional plural inlet ports are arranged to be in fluid communication with corresponding ones of the mutually isolated regions of the directional microporous diffuser. A solenoid-controlled distribution valve is coupled to the first inlet ports and additional plural inlet ports. The microporous diffuser can be disposed in a well or injected. The microporous diffuser emits microbubbles having a size in a range of 1 to 200 microns. The partitioning member divides the interior of the elongated member into four quadrants.

According to a further aspect of this invention, an apparatus includes a distribution arrangement to receive a fluid, a directional microporous diffuser, the directional microporous diffuser including an hollow elongated member having a sidewall with a large plurality of microporous openings, a partitioning member disposed in the interior of the hollow elongated member to divide the interior of the hollow elongated member into mutually isolated regions, with the regions being in fluid communication with the distribution arrangement and a control arrangement to control the distribution arrangement to effect discharge of fluid into selected ones of the mutually isolated regions in the elongated member to cause microbubbles to emanate from correspond portions of the sidewall of the directional microporous diffuser.

Other aspects of the invention include an ozone generator coupled to the first port of the directional microporous diffuser to deliver ozone and air as the first and second fluids. The elongated member is a cylinder. Microbubbles emanate from less than the entire sidewall portion of the directional microporous diffuser. The apparatus further includes a first pump to deliver a first stream of first fluid to the distribution arrangement and a second pump to deliver a second stream of a second fluid to the distribution arrangement. The directional microporous diffuser emits microbubbles having a size in a range of 1 to 200 microns.

According to a still further aspect of this invention, apparatus includes an elongated hollow member having a sidewall with a porosity characteristic, a partitioning member disposed within the elongated hollow member to partition the interior of the elongated hollow member into plural, mutually isolated chambers, a first cap with plural inlet ports that are in fluid communication with the plural mutually isolated chambers and an end cap to seal a second end of the directional microporous diffuser.

The sidewalls of the elongated member have a porosity characteristic of less than 200 microns. The sidewalls of the elongated member have a porosity characteristic of less than 100 microns. The directional microporous diffuser emits microbubbles having a size in a range of 0.5 to 80 microns. The sidewall is comprised of a metal or a plastic. The sidewall is of a hydrophobic material. The sidewall is comprised of sintered fused microscopic particles of plastic.

According to a still further aspect of this invention, a directional microporous diffuser includes a first elongated member including at least one sidewall having a plurality of microscopic openings, the sidewall defining an interior hollow portion of said member. The directional microporous diffuser further includes a second elongated member having a second sidewall having a plurality of microscopic openings, the second member being disposed through the hollow region of the first member. The directional microporous diffuser further includes a first partitioning member disposed inside and along a length of the first elongated member to provide a first plurality of isolated chambers and a second partitioning member disposed of the first elongated member and the second elongated member along the length of the first and second elongated members to provide a second plurality of isolated chambers. The directional microporous diffuser further includes an end cap to seal a first end of the directional microporous diffuser and an inlet cap disposed at a second end of directional microporous diffuser for receiving inlet fittings.

Other embodiments include the directional microporous diffuser having a region defined between the first and second elongated members filled with a catalyst suspension material. The directional microporous diffuser of claim has the first and second partitioning members aligned to provide the first plurality of isolated chambers aligned to the second plurality of isolated chambers. The directional microporous diffuser includes the inlet cap includes multiple inlet fittings, a first portion of the multiple inlet fittings in fluid communication with the corresponding chambers in the first member, and a second portion of the multiple inlet fittings in fluid communication with the corresponding chambers in the second member.

One or more advantages can be provided from the above.

While, a non-partitioned microporous diffuser can enlarge its radius of influence (ROI) by placing the non-partitioned microporous diffuser deeper within an aquifer, e.g., a substantial distance below the contaminants, the directional microporous diffuser provides a mechanism that can discharge microbubbles over a broad lateral area while having directional microporous diffuser remain close to contaminated groundwater zones during sparging. The directional microporous diffuser can cover broad lateral areas without diluting its effectiveness, since the oxidant gas emitted from the directional microporous diffuser can be emitted close to the source of contamination. The lateral areas over which the microbubbles are emitted can be larger since all of the microbubbles emitted from the directional microporous diffuser can be directed into one area at a time.

The partitioning member permits microbubbles to emerge from the surface of the directional microporous diffuser over portions of the directional microporous diffuser in accordance with which of the inlet ports of the directional microporous diffuser receives the fluid stream from the outlet ports of the solenoid-controlled valve. The partition member in the directional microporous diffuser together with the solenoid valve permits a gas stream from the central feed to be directed through one, two, three or all four of the quadrants of the directional microporous diffuser. In general, using a single quadrant at a time permits the microbubbles to exit the directional microporous diffuser and provide a generally elliptical shaped zone of influence in the surrounding soil formation. The zone of influence will extend further in a direction perpendicular from the directional microporous diffuser than tangentially from the sidewalls of the directional microporous diffuser The solenoid-controlled valve can be controlled to rotate the pattern of microbubbles emitted from the directional microporous diffuser. Thus, microbubbles exit from only a first quadrant during a first time period, then only from a second quadrant during a second time period, and so forth. The control can be automated or manual. The directional microporous diffuser allows fewer wells and sparging arrangements to be constructed on a site for a given sparging arrangement capacity, since all of the capacity of the pumps and so forth are directed into a single portion, e.g., quadrant of a microporous diffuser at any one time. The directional microporous diffuser can also be used to direct treatment towards especially high concentrations of contaminants while minimizing treatment materials in areas of lower contaminant concentrations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A-3D are diagrams depicting details of connections of a directional diffuser in the example shown in FIG. 1 or 2.

DETAILED DESCRIPTION

Figure 1:
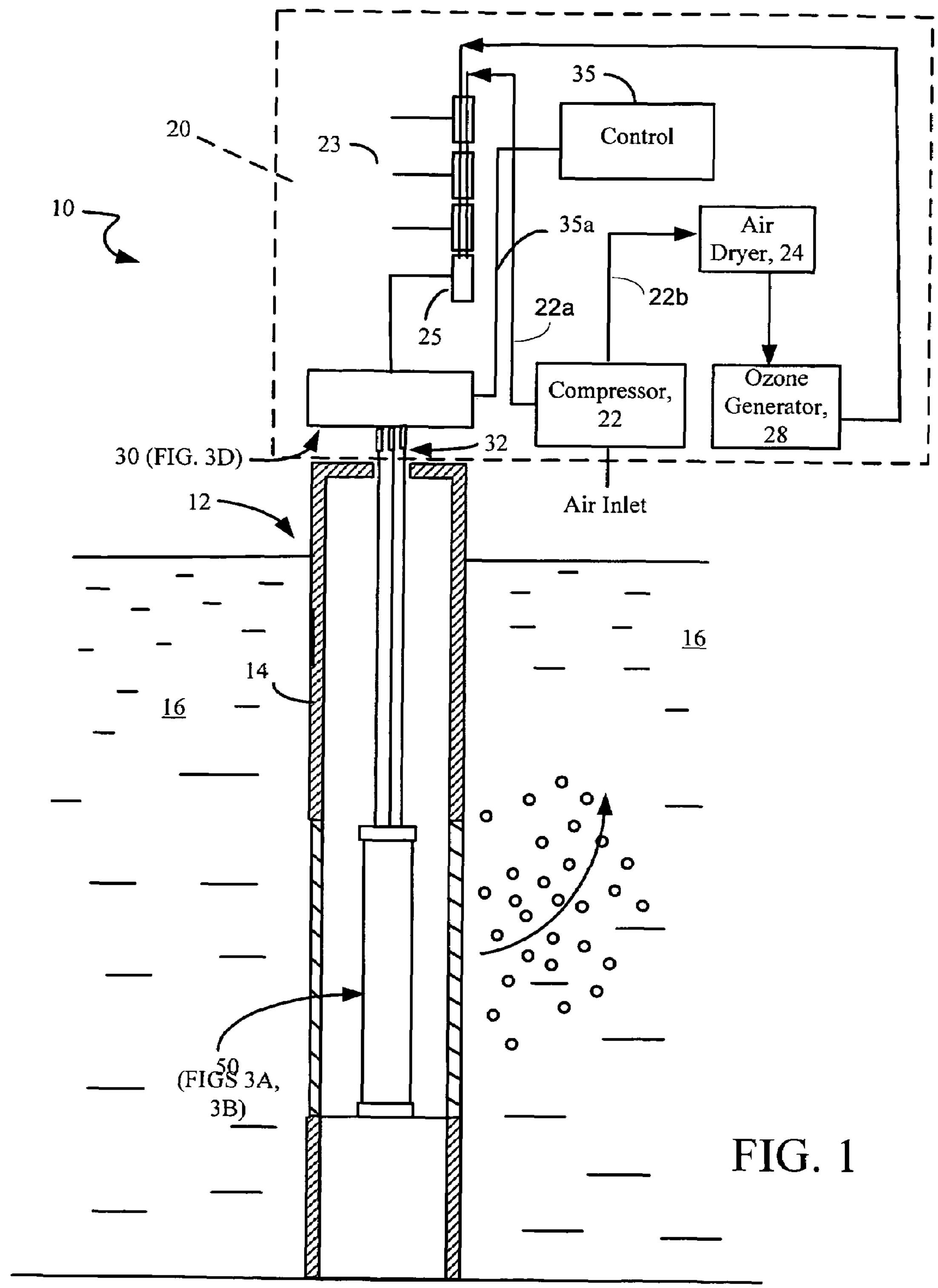
FIG. 1 is a cross-sectional view showing a sparging treatment example.

Referring now to FIG. 1, a sparging arrangement 10 for treating plumes, sources, deposits or occurrences of contaminants, is shown. The arrangement 10 is disposed in a well 12 that has a casing 14 with an inlet screen 14*a* and outlet screen 14*b* to promote a re-circulation of water into the casing 14 and through the surrounding ground/aquifer region 16. The casing 14 supports the ground about the well 12. Disposed through the casing 14 are one or more directional microporous diffusers 50 (discussed in FIGS. 3A-3C). Other arrangements are possible. For example, there need not be a recirculation arrangement.

The arrangement 10 also includes a mechanism 20 to deliver treatment fluids. The mechanism 20 includes a first compressor 22 and a compressor control mechanism 27. The compressor 22 has a first outlet to feed, via a line 22*a*, a first fluid, e.g., air into a manifold 23 comprised of three port solenoid controlled mixing valves 25. The compressor 22 includes a second outlet that is coupled, via line 22*b* to a second source, e.g., an ozone generator 28 to feed ozone ($O_3$) to the solenoid 23.

The three port solenoid controlled mixing valve 25 is coupled to an inlet port of a solenoid-controlled valve 30. The outlets of solenoid-controlled valve 30 are coupled to lines 33 via check valves 32.

The line 22*b* coupled between the compressor 22 and the ozone generator 28 allows air to enter the ozone generator directly rather than pulling it under siphon.

As shown in FIG. 3D, the solenoid valve 30 has a common inlet port 31 and here four branch or outlet ports 32*a*-32*d*. A control arrangement 35 controls the solenoid-controlled valve 30. The control arrangement 35 can be a series of switches to actuate the solenoids, via lines 35*a*, or could be more complicated schemes. The gas mixture from the central mixing valve 23 is distributable to each of the outlet ports 32*a*-32*d* of the solenoid-controlled valve 30.

The directional microporous diffuser 50 is fitted tightly inside the casing and in some embodiments the casing itself can be partitioned (not shown). For the embodiments where the casing is partitioned, the directional microporous diffuser 50 is aligned in the casing such that quadrants in the directional microporous diffuser 50 are aligned with quadrants in the casing. In some embodiments, packing material, e.g., sand may be disposed around the directional microporous diffuser 50. In other embodiments, grooves and rails (not shown) can be provided on the casing and directional microporous diffuser respectively, to allow the directional microporous diffuser to slide down the casing in alignment with partitions in the casing. The grooves and rails (not shown) in addition to providing alignment also provide an inherent isolation of the quadrants of the directional microporous diffuser 50 when inserted in the casing 14.

A non-partitioned microporous diffuser can enlarge its radius of influence (ROI) by placing the microporous diffuser deeper within an aquifer, e.g., a substantial distance below the contaminants. However, this approach dilutes the effectiveness of such a microporous diffuser since the oxidant gas emitted from the non-partitioned microporous diffuser travels vertically for some distance in order to reach the contaminants. Along the way some of the oxidant can dissolve or is absorbed or otherwise become ineffective. The directional microporous diffuser 50 provides a mechanism that can cover broad laterally areas while staying close to contaminated groundwater zones.

Figure 2:
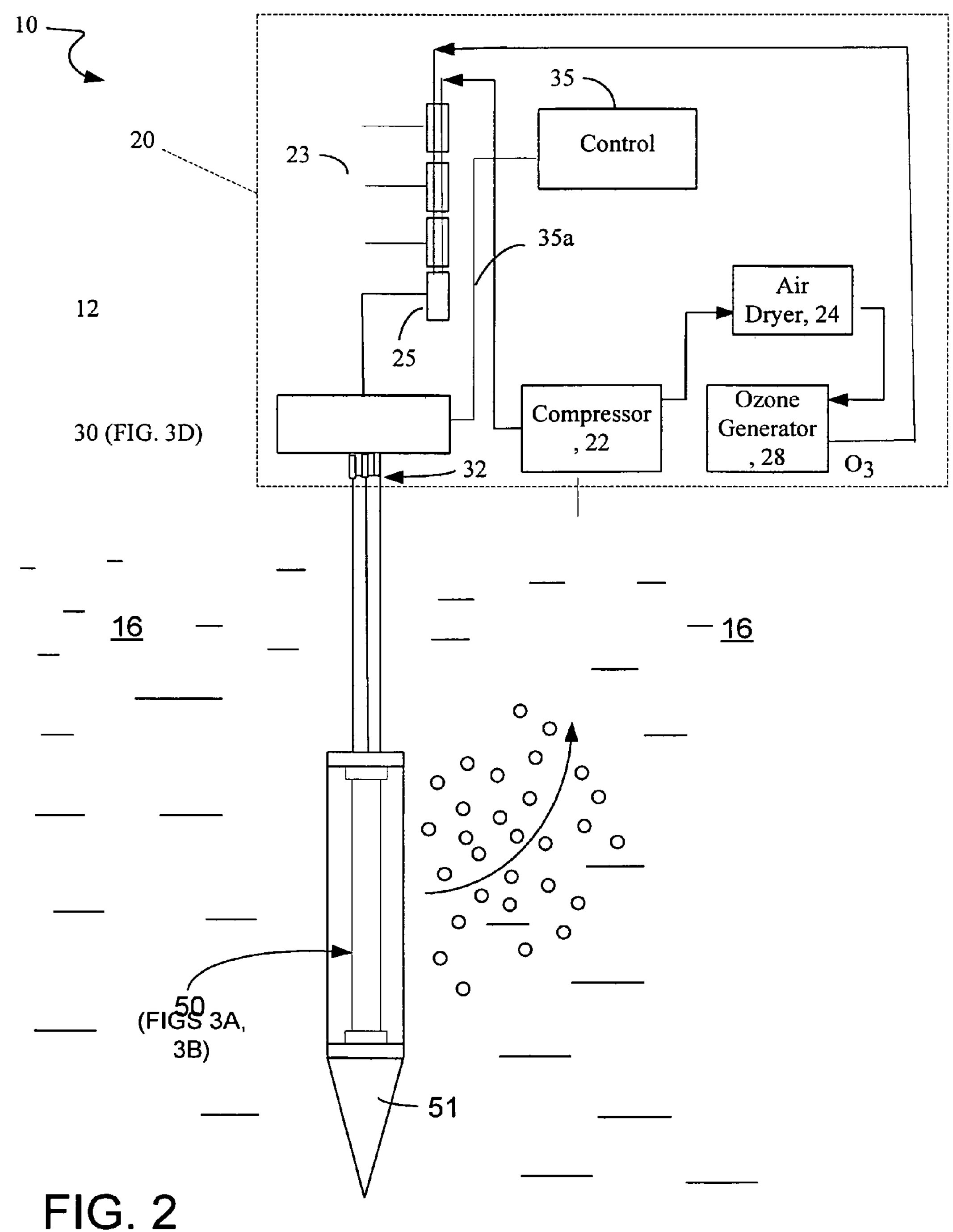
FIG. 2 is a cross-sectional view showing an alternative sparging treatment example.

Referring now to FIG. 2, an alternative sparging arrangement 100 for treating plumes, sources, deposits or occurrences of contaminants, is shown. The arrangement 100 includes one or more directional microporous diffusers 50 (discussed in FIGS. 3A-3C) disposed directly through a surrounding ground/aquifer region 16. As shown in FIG. 2, the directional microporous diffusers 50 are of a type that has a pointed member 51 on an end thereof to allow the pointed member to be driven or injected into the ground without the need for a well or casing as in FIG. 1. The arrangement 100 also includes the control mechanism 20 comprising the compressor 22, ozone generator 28 and so forth as discussed above.

In either arrangement 10 or 100, the outlet ports of the solenoid-controlled valve 30 are controlled by solenoids that selectively open and close the outlet ports 32*a*-32*d* permitting fluid to escape from one or more of the outlet ports 32*a*-32*d*. The outlet ports 32*a*-32*d* are coupled to feed lines generally 33 that are coupled to inlet fittings on a cap of the directional microporous diffuser 50. The directional microporous diffuser 50 allows microbubbles to be directed in selected directions into a surrounding soil formation 16, as discussed below.

In the embodiment described, a gas stream of ozone and air is delivered to the directional microporous diffuser 50. Other fluid streams could be used including, air, air enhanced with oxygen, a gas and liquid, e.g., hydrogen peroxide, air/ozone enhanced with hydrogen peroxide, or a hydro peroxide and so forth.

In the illustrated embodiments, microbubbles of air and ozone exit from walls of the directional microporous diffuser 50. The microbubbles of air/ozone affect substantial removal of below-mentioned or similar types of contaminants. The arrangement 10 can also include a pump (not shown) that supplies nutrients such as catalyst agents including iron containing compounds such as iron silicates or palladium containing compounds such as palladized carbon. In addition, other materials such as platinum may also be used.

The microbubbles promote rapid gas/gas/water reactions with volatile organic compounds, in which a substrate (catalyst or enhancer) participates in, instead of solely enhancing dissolved (aqueous) disassociation and reactions. The production of microbubbles and selection of appropriate size distribution is provided by using microporous material and a bubble chamber for optimizing gaseous exchange through high surface area to volume ratio and long residence time within the liquid to be treated. The equipment promotes the continuous production of microbubbles while minimizing coalescing or adhesion.

The injected air/ozone combination moves as a fluid into the material to be treated. The use of microencapsulated ozone enhances and promotes in-situ stripping of volatile organics and simultaneously terminates the normal reversible Henry s reaction. The process involves promoting simultaneous volatile organic compounds (VOC) in-situ stripping and gaseous decomposition, with moisture (water) and substrate (catalyst or enhancer). The basic chemical reaction mechanism of air/ozone encapsulated in micron-sized bubbles is further described in several of my issued patents such as U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775, "Microporous diffusion apparatus" all of which are incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, CO2 and H2O accomplishes this. In the case of petroleum products like BTEX (benzene, toluene, ethylbenzene, and xylenes), the benzene entering the bubbles reacts to decompose to CO2 and H2O.

Also, pseudo Criegee reactions with the substrate and ozone appear effective in reducing saturated olefins like trichloro alkanes (1,1,1-TCA), carbon tetrachloride ($CCl_4$), chloroform methyl chloride, and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform. Also, aromatic ring compounds such as oxygenates such as O-xylene, P-xylene, naphthalene and methyltetrabutylether (MTBE), ethyltetrabutylether (ETBE), and tertiaryamyltylether (TAME) can be treated.

Ozone is an effective oxidant used for the breakdown of organic compounds in water treatment. The major problem in effectiveness is that ozone as a dissolved species has a short lifetime. If ozone is mixed with sewage containing water above ground, the half-life is normally minutes. Ozone reacts quantitatively with PCE to yield breakdown products of hydrochloric acid, carbon dioxide, and water.

To offset the short life span, the ozone is injected with directional microporous diffusers, enhancing the selectiveness of action of the ozone. By encapsulating the gaseous ozone in fine bubbles, the ozone may have a 2-day half-life at normal (20°) temperatures. The bubbles preferentially extract a vapor phase fraction of the volatile compounds organic compounds they encountered. With this process, a vapor phase according to a partition governed by Henry's Law, of the volatile organics are selectively pulled into the fine air-ozone bubbles. The gas that enters a small bubble of volume ($4\pi r3$) increases until reaching an asymptotic value of saturation. The ozone in the bubbles attacks the volatile organics, generally by a Criegee or Criegee-like reaction.

The following characteristics of the contaminants appear desirable for reaction:

Henry's Constant: $10^{-2}$ to $10^{-5}$ $m^3$ atm$-m^3$/mol

Solubility: 10 to 20,000 mg/l

Vapor pressure: 1 to 3000 mmHg

Saturation concentration: 5 to 9000 $g/m^3$

The production of microbubbles and selection of appropriate size distribution are selected for optimized gas exchange through high surface area to volume ratio and long residence time within the area to be treated.

Referring now to FIGS. 3A-3D, exemplary details of an arrangement of the directional microporous diffuser 50 associated piping and the solenoid-controlled valve 30 is shown. The directional microporous diffuser 50 includes a first cylindrical member 56 that provides an outer cylindrical shell for the directional microporous diffuser 50. The cylindrical member 56 has a sidewall 56*a* comprised of a large plurality of micropores. A partitioning member 60 is coaxially disposed within the cylindrical member 56 and generally affixed, e.g., bonded or otherwise affixed to the inner portions of sidewall 56*a* by e.g., ridges and groves. Alternatively, the partitioning member is formed with the cylindrical member by being extruded with the cylindrical member, and so forth). The partitioning member 60, as illustrated, is comprised of two planar members that intersect each other at the center of the members, and which divides the cylindrical member into four, mutually isolated interior chambers 60*a*-60*d* along the length of the member 60, and which is particularly shown in the views of FIGS. 3B and 3C. Other configurations of fewer or more isolated chambers are possible.

The partitioning member 60 permits microbubbles to emerge from the surface of the directional microporous diffuser 50 over four, here equally sized quadrants. The microbubbles emerge from the quadrants in accordance with which on the inlet ports 52*a*-52*d* of the directional microporous diffuser 50 receives the fluid stream from the outlet ports 32*a*-32*d* of the solenoid-controlled valve 30. FIG. 3D shows in pictorial detail the solenoid-controlled valve 30 including inlet 31 and the outlet ports 32*a*-32*d*.

Proximate ends of the cylindrical members 56 are coupled to inlet ports generally denoted as 52*a*. The inlet ports 52*a* are supported on an inlet cap 52 that seals one end of the cylindrical member 56. The inlet ports 52*a* are arranged in relation to the four mutually isolated chambers 60*a*-60*d* provided within the directional microporous diffuser 50 such that the inlet ports 52*a* allow a fluid delivered to the inlet ports 52*a* to enter the respective chamber in the interior of the directional microporous diffuser. In one embodiment, the fluid delivered to the inlet ports 52*a* is a mixture of air and ozone, as described above. At the opposite end of the directional microporous diffuser 50 an end cap 54 covers the second, distal end of cylindrical member 56. Together end cap 54 and cap 52 seal the ends of the directional microporous diffuser 50. While, the cylindrical member 56 is disclosed as being cylindrical in shape, in general the configuration could have other shapes. The partitioning member 60 can extend beyond the length of the cylindrical member such that ends of the partitioning member 60 sit in grooves provided in caps 52 and 54.

The cylindrical member 56 has a plurality of microscopic openings constructed through sidewalls 56*a*. The openings generally have a pore sizes matched to a surrounding ground formation so as to be effective for inducing gas/gas reactions with introduction of the microbubbles. Sidewalls of each of the cylindrical members can have a pore diameter in a range of 1-200 microns, preferably 1-80 microns and more preferably 1-20 microns. The combination of the inlet cap 52 and end cap 54 seals the directional microporous diffuser 50 permitting the microbubbles to escape only via the porous construction of the sidewalls of the directional microporous diffusers.

The partition member 60 in the directional microporous diffuser 50 together with the solenoid valve 30 permits a gas stream from the central feed to be directed through one, two, three or all four of the quadrants of the directional microporous diffuser 50. Thus, the pattern of the gas stream that exits from the directional microporous diffuser can be adjusted. In general, using a single quadrant at a time permits the bubbles to exit the directional microporous diffuser and have a generally elliptical shaped zone of influence in the surrounding soil formation, that is the zone of influence will extend further in a direction perpendicular from the directional microporous diffuser 50 that tangentially from the sidewalls of the directional microporous diffuser 50. The treatment zone has a longer radius perpendicular to the surface of the directional microporous diffuser than the treatment zone that could be provided were the arrangement used with a non partitioned, non directional microporous diffuser.

The solenoid-controlled valve 30 can be controlled to rotate the pattern of microbubbles emitted from the directional microporous diffuser 50 by permitting microbubbles to exit from only a first quadrant, then only a second quadrant, and so forth. The control can be automated or manual. The directional microporous diffuser 50 allows fewer wells and sparging arrangements 10 to be constructed on a site for a given sparging arrangement capacity by directing all of the capacity of the pumps and so forth into a single quadrant of a directional microporous diffuser at any one time. The directional microporous diffuser 50 can also be used to direct treatment towards especially high concentrations of contaminants while minimizing treatment materials in areas of lower contaminant concentrations. Once a first region is treated, the solenoid can be activated to close the outlet that feeds the first quadrant that treated the first region and open a second outlet of the solenoid to feed a second, different quadrant and treat a second different region.

Figure 4A:
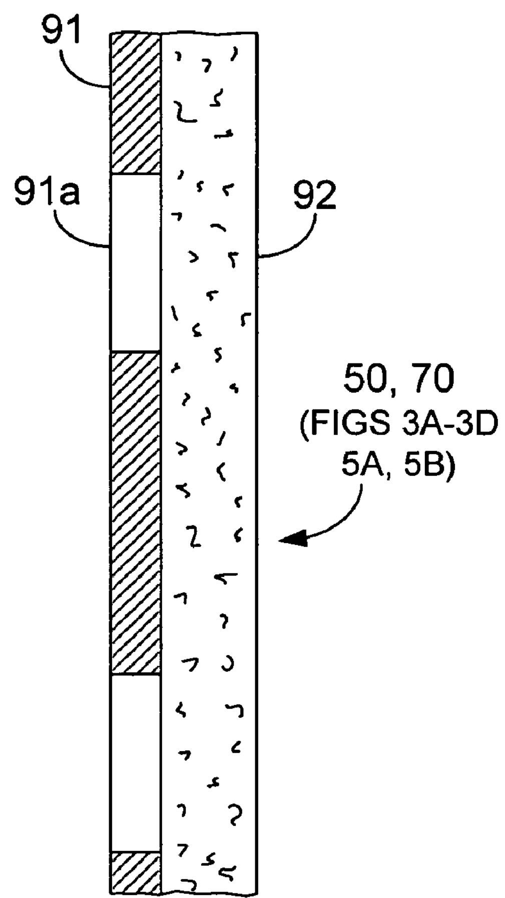
FIGS. 4A and 4B are cross-sectional view of sidewalls of the directional microporous diffusers of FIGS. 3A, 3B showing exemplary construction details.
Figure 4B:
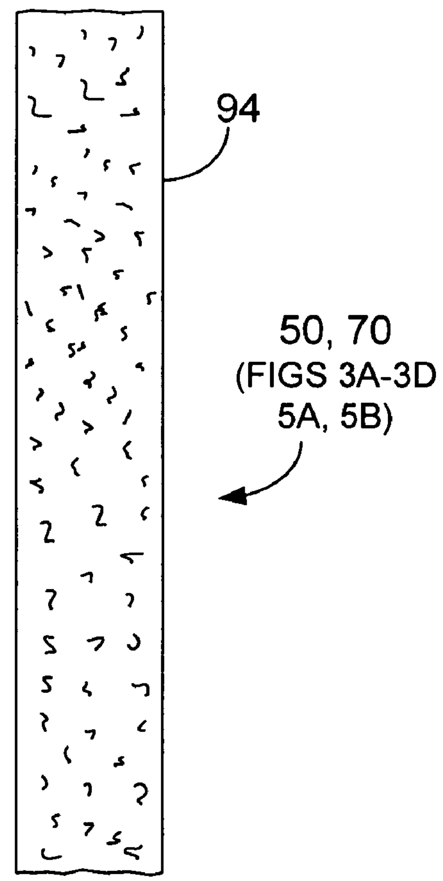

Referring now to FIGS. 4A, 4B details of sidewalls of the directional microporous diffusers 50 are shown. FIG. 4A shows that sidewalls of the members can be constructed from a metal or a plastic support layer 91 having large (as shown) or fine perforations 91*a* over which is disposed a layer of a sintered i.e., heat fused microscopic particles of plastic. The plastic can be any hydrophobic material such as polyvinylchloride, polypropylene, polyethylene, polytetrafluoroethylene, high-density polyethylene (HDPE) and ABS. The support layer 91 can have fine or coarse openings and can be of other types of materials. Other materials are possible such as porous stainless steel and so forth.

FIG. 4B shows an alternative arrangement 94 in which sidewalls of the members are formed of a sintered i.e., heat fused microscopic particles of plastic. The plastic can be any hydrophobic material such as polyvinylchloride, polypropylene, polyethylene, polytetrafluoroethylene, high-density polyethylene (HDPE) and alkylbenzylsulfonate (ABS).

The fittings (e.g., the inlets in FIGS. 3A-3D) can be threaded and are attached to the inlet cap members by epoxy, heat fusion, solvent or welding with heat treatment to remove volatile solvents or other approaches. Standard threading can be used for example NPT (national pipe thread) or box thread e.g., (F480). The fittings are securely attached to the directional microporous diffusers in a manner that insures that the directional microporous diffusers can handle pressures that are encountered with injecting of the air/ozone.

Figure 5A:
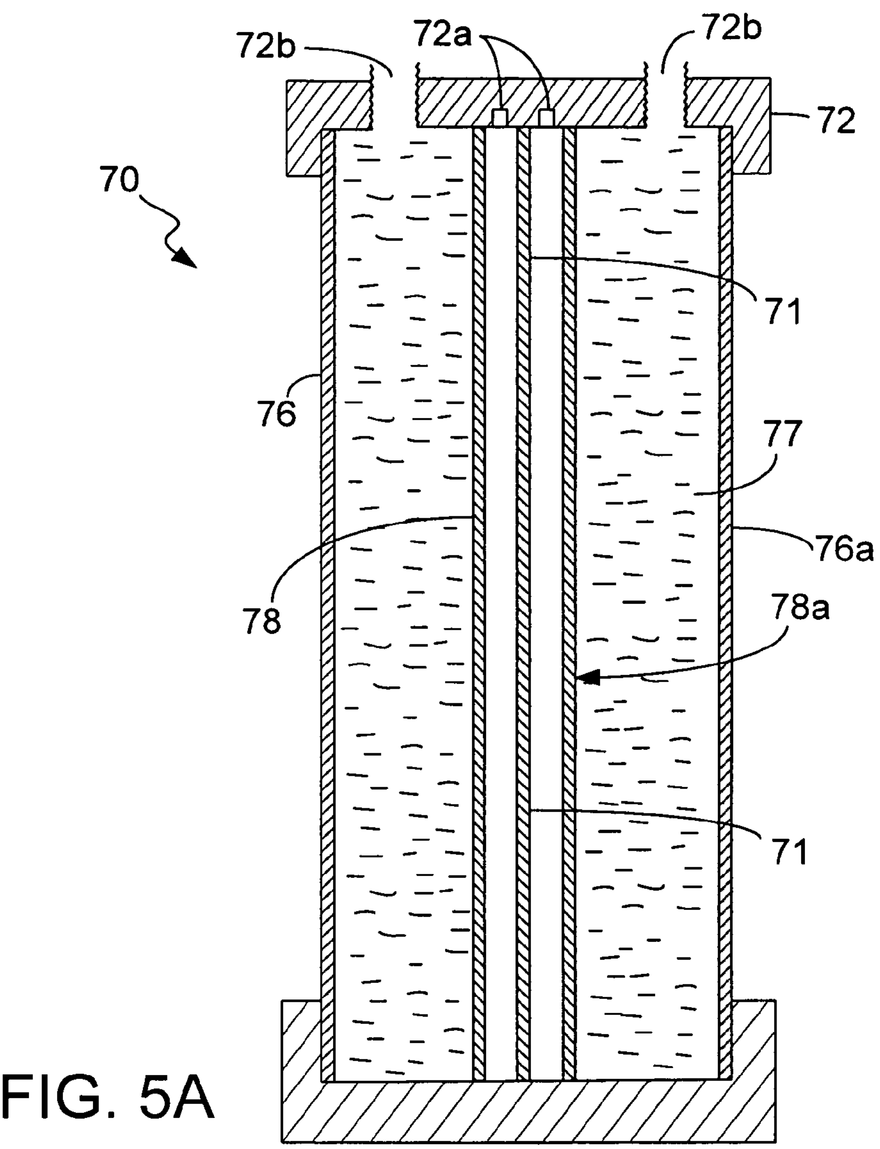
FIGS. 5A and 5B are longitudinal cross-section and plan cross-sectional views of a directional microporous diffuser useful in the arrangement of FIG. 1.
Figure 5B:
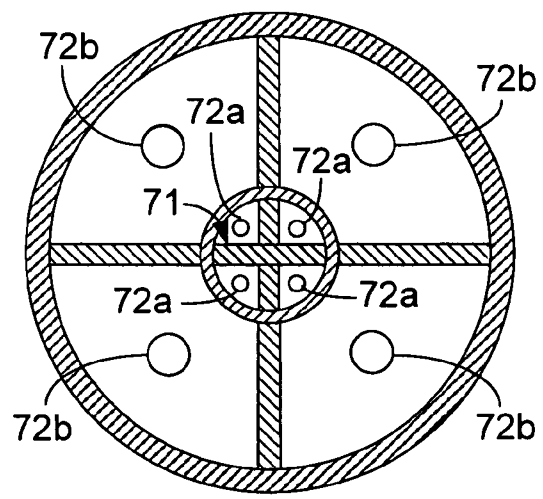

Referring now to FIGS. 5A and 5B, an alternate embodiment 70 of a directional microporous diffuser is shown. The directional microporous diffuser 70 includes an outer cylindrical member 76 having a sidewall 76*a* within which is disposed an inner cylindrical member 78 having a sidewall 78*a*. The inner cylindrical member 78 is spaced from the sidewall 78*a* of the outer cylindrical member. The space 77 between the inner and outer cylindrical members 76, 78 is filled with a packing material comprised of glass beads or silica particles (silicon dioxide) or porous plastic that is hydrophilic. A first partitioning member 71 is disposed within the inner cylindrical member 78 and a second partitioning member 73 generally aligned with the first partitioning member 71 is disposed between inner portions of the sidewall 76*a* of the outer cylindrical member 76 and the outer portions of the sidewall 78*a* of the inner cylindrical member 78. The space 77 is coupled to input ports generally 72*b*.

The directional microporous diffuser 70 has the inner cylindrical member 76 disposed coaxial or concentric to cylindrical member 78. Sidewalls of each of the cylindrical members 76, 78 can have a pore diameter in a range of 1-200 microns, preferably 1-50 microns and more preferably 5-20 microns. A proximate end of the inner cylindrical member is coupled to inlet ports 72*a*, which are fed an air ozone mixture from the first solenoid valve 30. The directional microporous diffuser also includes an end cap 74, which secures distal ends of the cylinders 76 and 78. The combination of the inlet cap 72 and end cap 74 seals the directional microporous diffuser permitting liquid and gas to escape by the porous construction of sidewalls of the directional microporous diffusers.

The partition members 71 and 73 in the directional microporous diffuser 70 together with the solenoid valve 30 permit a gas stream to be directed through one, two, three or all four of the quadrants of inner member 78. The gas stream that exits from inner member 78 enters outer quadrants between the inner and outer members where it mixes with, e.g., liquid to coat the microbubbles with a liquid coating of, e.g., water or hydrogen peroxide or a hydro peroxide. In general, using a single quadrant at a time permits the coated microbubbles to exit the directional microporous diffuser 70 over the sidewall surface of a single quadrant. The coated microbubbles cover a generally elliptical shaped zone of influence in the surrounding soil formation, as discussed above for directional microporous diffuser 50.

In some embodiments of the microporous diffuser 70, one of the partitioning members can be eliminated to simplify construction of the microporous diffuser 70.

Figure 6:
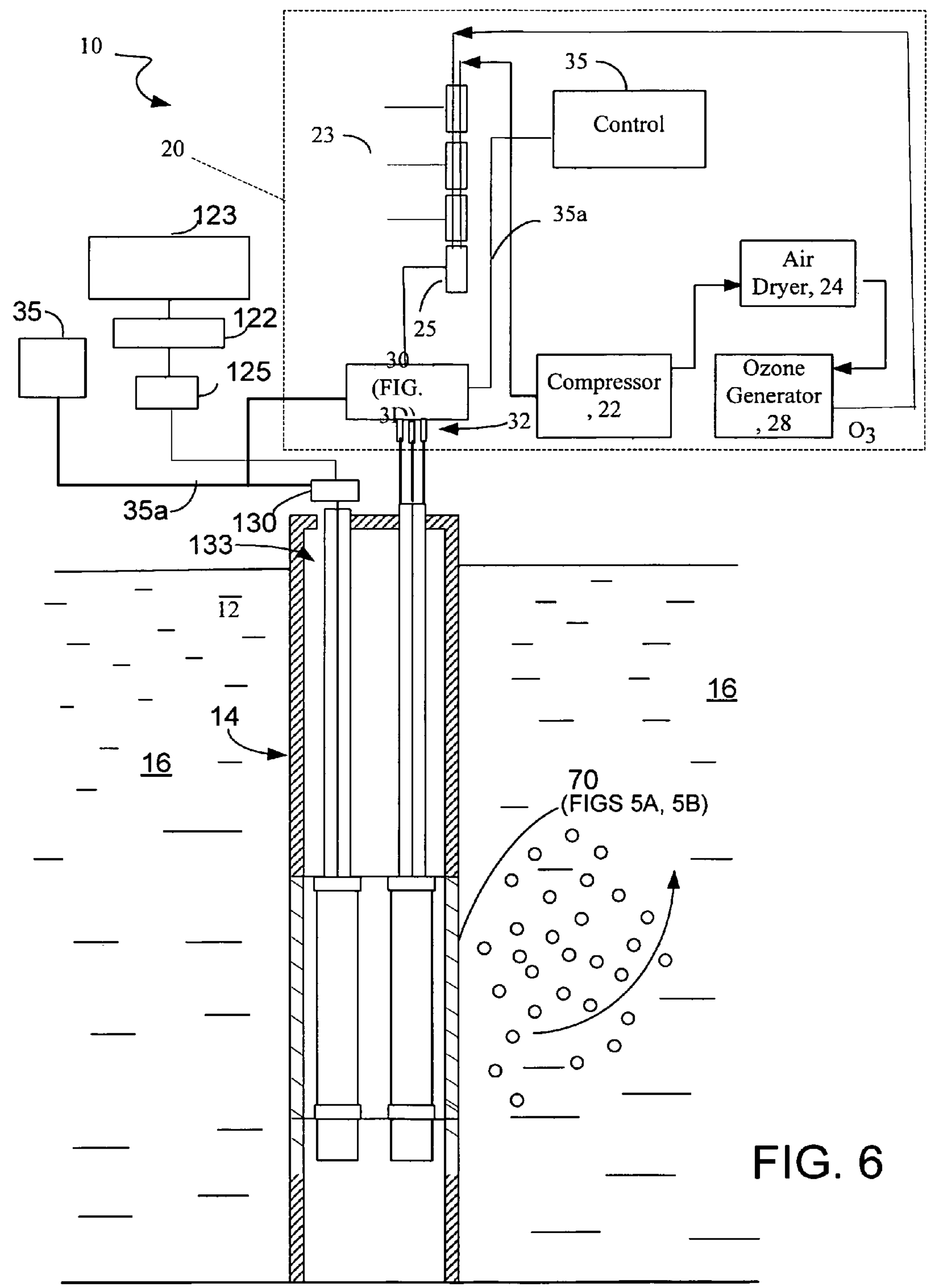
FIG. 6 is a cross-sectional view showing a sparging treatment example.

Referring to FIG. 6 an example of a sparging arrangement 120 using the directional microporous diffuser 70 is shown. The sparging arrangement 120 includes a source 123 (of liquid and catalysts, and/or nutrients) and a pump 122 coupled to a check valve 125 and a second solenoid-controlled valve 130. The second solenoid-controlled valve 130 has outlets (not numbered) coupled to a second set of feed lines 133 that are coupled to input ports 72*b* of the directional microporous diffuser 70. The directional microporous diffuser 70 receives liquid, catalysts, and/or nutrients, which mixes in the directional microporous diffuser 70 with the gaseous stream provided via feed lines 33 to effect coated microbubbles and so forth, as in the patents mentioned above, e.g., U.S. Pat. No. 6,582,611 or U.S. Pat. No. 6,436,285 for instance.

Otherwise, the arrangement 120, as shown in FIG. 6, is analogous to the arrangements 10, 100 shown in FIG. 1 or 2 but for the addition of the pump 122, source 123, check valve 125, the second set of feed lines 133 and the second solenoid-controlled valve 130 and thus also includes the mechanism 20. The control arrangement 35 is shown controlling both solenoid-controlled valves 30 and 130.

A number of embodiments of the invention have been described. Nevertheless, it will be understood that various modifications may be made without departing from the spirit and scope of the invention.

What is claimed is:

1. A directional sparging apparatus comprising:

an elongate member divided into a plurality of mutually isolated chambers by one or more partitions and having a sidewall of porous material, said chambers disposed radially about a center axis of the elongate member;

a distribution arrangement to receive a fluid; and a control arrangement to control the distribution arrangement to effect discharge of the fluid into selected chambers of the elongate member, wherein the one or more partitions directs the fluid entering each chamber through the sidewall of that chamber.

2. The directional sparging of claim 1 further comprising an air compressor having a first outlet to feed air to the distribution arrangement; and an ozone generator coupled between a second outlet of the air compressor and the distribution arrangement, to convert a portion of the oxygen in the air feed into ozone.

3. The directional sparging apparatus of claim 2 further comprising:

a multi-port mixing valve that receives the air and ozone.

4. The directional sparging apparatus of claim 3 further comprising an air dryer coupled between the air compressor and the ozone generator.

5. The directional sparging apparatus of claim 1 wherein sequencing from the control arrangement controls directional emanation of microbubbles from one or more chambers of the elongate member.

6. The directional sparging apparatus of claim 3 further comprising:

a pressurized feed line to deliver the air/ozone mixture from the multi-port mixing valve to a wellhead.

7. The directional sparging apparatus of claim 6 further comprising:

a multi-way solenoid controlled valve disposed at a wellhead and coupled to the pressurized line, the multi-way solenoid controlled valve having an input that is fed by the pressurized line.

8. The directional sparging apparatus of claim 7 wherein the multi-way solenoid controlled valve includes four outputs that are controlled by the control arrangement.

9. The directional sparging apparatus of claim 8 wherein the four outputs in the multi-way solenoid controlled valve are coupled to inlets on the elongate member, via feed tubes, to effect discharge of air/ozone into selected ones of mutually isolated regions in the elongate member.

10. The directional sparging apparatus of claim 8 further comprising one-way check valves coupled between multi-way solenoid controlled valve and the feed tubes.

11. The directional sparging apparatus of claim 1 wherein the elongate member comprises:

a pointed member disposed on a portion of the elongate member to allow the elongate member to be driven into the ground.

12. The directional sparging apparatus of claim 1 wherein the elongate member emits microbubbles having a size in a range of 0.1 to 200 microns.

13. The directional sparging apparatus of claim 1 further comprising a second control arrangement and a second distribution arrangement to control fluid fed to a second elongate member.

14. The directional sparging apparatus of claim 13 wherein the elongate member has a first set of inlet ports to receive the air/ozone and a second port to receive a liquid.

15. The directional sparging apparatus of claim 14 wherein the elongate member emits liquid coated microbubbles.

16. The directional sparging apparatus of claim 1 wherein the elongate member comprises:

a sidewall, defining an interior that is divided into plural, mutually isolated chambers by one or more partitions; and end caps to seal ends of the elongate member, with one of the end caps having inlet ports.

17. The directional sparging apparatus of claim 16 wherein a partitioning member divides the interior of the elongate member into four chambers.

18. The directional sparging apparatus of claim 16 wherein the elongate member is a cylinder.

19. The directional sparging apparatus of claim 16 wherein one of the caps supports the inlet ports and an additional set of inlet ports.

20. The directional sparging apparatus of claim 19 wherein the first inlet port and additional plural inlet ports are arranged to be in fluid communication with corresponding ones of the mutually isolated chambers of the elongate member.

21. The directional sparging apparatus of claim 20 wherein the additional set of inlets deliver a peroxide.

* * * * *